(12) United States Patent
Comber

(10) Patent No.: US 12,143,278 B2
(45) Date of Patent: Nov. 12, 2024

(54) MANAGING REMOTE TERMINAL COMMUNICATIONS

(71) Applicant: Schneider Electric (Australia) Pty Ltd., Macquarie Park (AU)

(72) Inventor: Brett Comber, Mount Eliza (AU)

(73) Assignee: SCHNEIDER ELECTRIC (AUSTRALIA) PTY LTD., Macquarie Park (AU)

( * ) Notice: Subject to any disclaimer, the term of this patent is extended or adjusted under 35 U.S.C. 154(b) by 0 days.

(21) Appl. No.: 18/420,093

(22) Filed: Jan. 23, 2024

(65) Prior Publication Data

US 2024/0223466 A1 Jul. 4, 2024

Related U.S. Application Data

(63) Continuation of application No. 18/063,211, filed on Dec. 8, 2022, now Pat. No. 11,924,054.

(60) Provisional application No. 63/377,217, filed on Sep. 27, 2022.

(51) Int. Cl.
*H04L 41/16* (2022.01)
*H04L 43/0852* (2022.01)

(52) U.S. Cl.
CPC .......... *H04L 41/16* (2013.01); *H04L 43/0852* (2013.01)

(58) Field of Classification Search
CPC ............................ H04L 41/16; H04L 43/0852
USPC ......................................................... 709/224
See application file for complete search history.

(56) References Cited

U.S. PATENT DOCUMENTS

| | | | | |
|---|---|---|---|---|
| 6,950,851 B2 * | 9/2005 | Osburn, III | ............... | H04L 9/40 709/227 |
| 7,006,524 B2 * | 2/2006 | Freeman | .................. | H04Q 9/00 455/445 |
| 7,446,673 B2 * | 11/2008 | Ocondi | ..................... | H04Q 9/00 340/870.03 |
| 8,392,592 B2 * | 3/2013 | Johnson | .................. | H04L 67/12 709/227 |

(Continued)

FOREIGN PATENT DOCUMENTS

| | | | | |
|---|---|---|---|---|
| AU | 2016330769 B2 * | 5/2020 | ............. | G05B 19/00 |
| EP | 3520562 B1 * | 9/2020 | ............. | H04L 63/02 |

(Continued)

OTHER PUBLICATIONS

A. A. Khan, M. H. Rehmani and M. Reisslein, "Cognitive Radio for Smart Grids: Survey of Architectures, Spectrum Sensing Mechanisms, and Networking Protocols," in IEEE Communications Surveys & Tutorials, vol. 18, No. 1, pp. 860-898, Firstquarter 2016, doi: 10.1109/COMST.2015.2481722. (Year: 2016).

(Continued)

*Primary Examiner* — Melvin H Pollack
(74) *Attorney, Agent, or Firm* — Stinson LLP

(57) ABSTRACT

Methods and systems for managing remote terminal communications in remote Supervisory Control and Data Acquisition (SCADA) and telemetry networks. Reinforced machine learning processes header data of multiple messages received from remote data radios to predict which of the data radios are currently ready with a response to transmit based on or using information associated with a learned time delay. Time on shared wireless channels is efficiently allocated to the data radios that are currently ready with the response.

21 Claims, 4 Drawing Sheets

(56) References Cited

U.S. PATENT DOCUMENTS

| | | | | |
|---|---|---|---|---|
| 8,639,267 | B2* | 1/2014 | Johnson | H04W 64/003 |
| | | | | 455/456.3 |
| 8,837,472 | B2* | 9/2014 | Viger | H04J 3/06 |
| | | | | 370/503 |
| 8,891,538 | B2* | 11/2014 | Chandrasekaran | ........................ |
| | | | | H04L 41/0672 |
| | | | | 709/224 |
| 8,938,219 | B2* | 1/2015 | Parent | H04W 4/70 |
| | | | | 455/414.3 |
| 9,401,839 | B2* | 7/2016 | Kidwell | G05B 19/4183 |
| 9,648,515 | B2* | 5/2017 | Velev | H04Q 3/0045 |
| 9,699,685 | B1* | 7/2017 | Zhou | G01R 31/371 |
| 9,888,346 | B2* | 2/2018 | Rabinowitz | H04W 4/025 |
| 10,678,233 | B2 | 6/2020 | Cella et al. | |
| 10,687,389 | B2* | 6/2020 | Samudrala | H04W 76/15 |
| 10,897,398 | B2* | 1/2021 | Al-Yousef | H04L 41/0813 |
| 10,909,067 | B2* | 2/2021 | Rangachari | H04L 47/2441 |
| 11,012,591 | B2* | 5/2021 | Wang | H04L 65/70 |
| 11,016,457 | B1* | 5/2021 | Gilbert | G05B 19/042 |
| 11,086,282 | B2* | 8/2021 | Chapman | G05B 19/0428 |
| 11,199,837 | B2 | 12/2021 | Cella et al. | |
| 11,291,045 | B2 | 3/2022 | Hedayat et al. | |
| 11,343,195 | B1* | 5/2022 | Kolev | H04L 65/1069 |
| 11,391,600 | B2 | 7/2022 | Frader-Thompson et al. | |
| 11,477,699 | B2 | 10/2022 | Asterjadhi et al. | |
| 11,483,797 | B2 | 10/2022 | Mukherjee et al. | |
| 11,564,241 | B2* | 1/2023 | Sinn | H04W 24/08 |
| 11,646,854 | B2 | 5/2023 | Yang et al. | |
| 11,665,589 | B2 | 5/2023 | Kotaru et al. | |
| 11,671,320 | B2 | 6/2023 | Smith et al. | |
| 11,678,272 | B2 | 6/2023 | Elsayed et al. | |
| 11,694,098 | B2 | 7/2023 | Song et al. | |
| 11,722,359 | B2 | 8/2023 | Fenoglio et al. | |
| 11,729,105 | B2 | 8/2023 | Alisawi et al. | |
| 11,743,093 | B2 | 8/2023 | Li et al. | |
| 11,751,090 | B2 | 9/2023 | Ho et al. | |
| 11,758,025 | B2 | 9/2023 | Chhabra et al. | |
| 11,758,583 | B2 | 9/2023 | Hedayat | |
| 11,765,593 | B2 | 9/2023 | Howe et al. | |
| 11,770,220 | B2 | 9/2023 | Bala et al. | |
| 11,770,307 | B2 | 9/2023 | Veggalam et al. | |
| 11,774,944 | B2 | 10/2023 | Cella et al. | |
| 11,777,812 | B2 | 10/2023 | Mayyuri et al. | |
| 11,875,192 | B2* | 1/2024 | Ono | G06F 9/5072 |
| 11,985,544 | B2* | 5/2024 | Narasimha | H04W 88/085 |
| 2005/0271128 | A1* | 12/2005 | Williams | H04L 43/0817 |
| | | | | 375/222 |
| 2009/0225682 | A1 | 9/2009 | Grote-Lopez et al. | |
| 2013/0053986 | A1* | 2/2013 | Goose | G05B 19/4183 |
| | | | | 700/9 |
| 2017/0230939 | A1* | 8/2017 | Rudolf | H04W 72/04 |
| 2019/0021114 | A1 | 1/2019 | Barber | |
| 2021/0037569 | A1 | 2/2021 | Sandholm et al. | |
| 2022/0030664 | A1* | 1/2022 | Dotson | H04L 63/0823 |
| 2022/0108262 | A1 | 4/2022 | Cella et al. | |
| 2022/0286854 | A1 | 9/2022 | Howe et al. | |
| 2022/0286911 | A1 | 9/2022 | Howe et al. | |
| 2023/0067464 | A1 | 3/2023 | Jonietz et al. | |
| 2023/0105719 | A1 | 4/2023 | Kang et al. | |
| 2023/0132476 | A1 | 5/2023 | Shemer et al. | |
| 2023/0135745 | A1 | 5/2023 | Liu et al. | |
| 2023/0140312 | A1 | 5/2023 | Ajami et al. | |
| 2023/0199641 | A1 | 6/2023 | Naik et al. | |
| 2023/0214304 | A1 | 7/2023 | Mishra et al. | |
| 2023/0217308 | A1 | 7/2023 | Sandberg et al. | |
| 2023/0222454 | A1 | 7/2023 | Cella et al. | |
| 2023/0224226 | A1 | 7/2023 | Pestaa | |
| 2023/0231802 | A1 | 7/2023 | Vysotsky et al. | |
| 2023/0246971 | A1 | 8/2023 | Sesha | |
| 2023/0262117 | A1 | 8/2023 | Bernardos et al. | |
| 2023/0292218 | A1 | 9/2023 | Crabbs | |
| 2023/0308903 | A1 | 9/2023 | Kim et al. | |
| 2023/0309161 | A1* | 9/2023 | Rao | H04L 5/0048 |
| 2023/0318923 | A1 | 10/2023 | Kalbo | |
| 2023/0319533 | A1 | 10/2023 | Ly et al. | |
| 2023/0325720 | A1 | 10/2023 | Cella et al. | |
| 2023/0327457 | A1 | 10/2023 | Cella et al. | |
| 2023/0328622 | A1 | 10/2023 | Park et al. | |
| 2023/0370896 | A1* | 11/2023 | Kim | H04W 28/0983 |
| 2023/0394644 | A1* | 12/2023 | Manner | G06Q 10/20 |
| 2024/0146808 | A1* | 5/2024 | Oshetski | H04Q 9/00 |

FOREIGN PATENT DOCUMENTS

| | | | | |
|---|---|---|---|---|
| EP | 3515011 | B1 * | 11/2023 | H04L 63/02 |
| ES | 2727700 | T3 * | 10/2019 | H04L 25/20 |
| ES | 2921275 | T3 * | 8/2022 | G05B 19/4185 |
| WO | WO-2005006707 | A1 * | 1/2005 | G06F 21/606 |
| WO | 2023011992 | A1 | 2/2023 | |

OTHER PUBLICATIONS

Rehman A, Haseeb K, Jeon G, Bahaj SA. Secure Edge-Based Energy Management Protocol in Smart Grid Environments with Correlation Analysis. Sensors. Nov. 2022; 22(23):9236. https://doi.org/10.3390/s22239236 (Year: 2022).

Geeta Yadav, Kolin Paul, "Architecture and security of SCADA systems: A review," International Journal of Critical Infrastructure Protection, vol. 34, 2021. (Year: 2021).

D. Pliatsios, P. Sarigiannidis, T. Lagkas and A. G. Sarigiannidis, "A Survey on SCADA Systems: Secure Protocols, Incidents, Threats and Tactics," in IEEE Communications Surveys & Tutorials, vol. 22, No. 3, pp. 1942-1976, thirdquarter 2020, doi: 10.1109/ COMST.2020.2987688. (Year: 2020).

M. N. Bhuiyan, M. M. Rahman, M. M. Billah and D. Saha, "Internet of Things (IoT): A Review of Its Enabling Technologies in Healthcare Applications, Standards Protocols, Security, and Market Opportunities," in IEEE Internet of Things Journal, vol. 8, No. 13, pp. 10474-10498, 1 Jul. 1, 2021. (Year: 2021).

T. Theodorou and L. Mamatas, "A Versatile Out-of-Band Software-Defined Networking Solution for the Internet of Things," in IEEE Access, vol. 8, pp. 103710-103733, 2020, doi: 10.1109/ACCESS.2020.2999087. (Year: 2020).

Q. Yang, J. A. Barria and T. C. Green, "Communication Infrastructures for Distributed Control of Power Distribution Networks," in IEEE Transactions on Industrial Informatics, vol. 7, No. 2, pp. 316-327, May 2011, doi: 10.1109/TII.2011.2123903. (Year: 2011).

J.R. Moyne and D. M. Tilbury, "The Emergence of Industrial Control Networks for Manufacturing Control, Diagnostics, and Safety Data," in Proceedings of the IEEE, vol. 95, No. 1, pp. 29-47, Jan. 2007, doi: 10.1109/JPROC.2006.887325. (Year: 2007).

Brendan Galloway and Gerhard P. Hancke, Introduction to Industrial Control Networks, IEEE Communications Surveys and Tutorials. 2012. (Year: 2012).

Supervisory Control and Data Acquisition (SCADA) Systems, National Communications System, Technical Information Bulletin 04-1, Oct. 2004. (Year: 2004).

Alexandru Ujvarosi, Evolution of SCADA Systems, Bulletin of the Transilvania University of Brasov, Series I: Engineering Sciences, vol. 9 (58) No. 1, 2016, pp. 63-68. (Year: 2016).

George Lu; Y.J. Yang, "IoT and Smart Infrastructure," in Internet of Things and Data Analytics Handbook, Wiley, 2017, pp. 481-493, doi: 10.1002/9781119173601.ch29. (Year: 2017).

Duy et al., "Packet Delivery Maximization Using Deep Reinforcement Learning-Based Transmission Scheduling for Industrial Cognitive Radio Systems", IEEE Access, vol. 9, Oct. 26, 2021, 18 pages.

Szott et al., "Wi-Fi Meets ML: A Survey on Improving IEEE 802.11 Performance with Machine Learning", arxiv.org, Cornell University Library, Feb. 9, 2022, 55 pages.

Extended European Search Report for EP Application No. 23191935.8, dated Dec. 7, 2023, 9 pages.

* cited by examiner

```
∨ Data Chunk: 0
    Data Chunk: c1c1013c0206
    [Data Chunk length: 6]
    Data Chunk checksum: 0x76b5 [correct]
    [Data Chunk Checksum Status: Good]
∧ [1 DNP 3.0 AL Fragment (5 bytes): #4(5)]
∨ Application Layer: (FIR, FIN, Sequence 1, Read)
    Application Control: 0xc1, First, Final(FIR, FIN, Sequence 1)
        1... .... = First: Set
        .1.. .... = Final: Set
        ..0. .... = Confirm: Not set
        ...0 .... = Unsolicited: Not set
        .... 0001 = Sequence: 1
    Function Code: Read (0x01)
    READ Request Data Objects
∨ Object(s): Class 1 Data (Obj:60, Var:02) (0x3c02)
                                                    ── 304
```

FIG. 3B

MANAGING REMOTE TERMINAL COMMUNICATIONS

CROSS-REFERENCE TO RELATED APPLICATIONS

This application is a continuation of U.S. patent application Ser. No. 18/063,211, filed Dec. 8, 2022, which claims priority to U.S. Provisional Patent Application No. 63/377,217, filed Sep. 27, 2022, the entire disclosures of which are incorporated herein by reference.

BACKGROUND

In a typical industrial automation system, a Supervisory Control and Data Acquisition (SCADA) system communicates with many industrial assets, including smart devices such as remote terminal units (RTUs) and programmable logic controllers (PLCs). These devices provide remote industrial or resource monitoring and control and are configured for use in a particular application (e.g., oil and gas, water and waste water, renewable energy). The SCADA system typically communicates with remote devices via a private data radio network and/or a cellular telephone network. For example, the private data radio network includes a data radio coupled to the SCADA system acting as a base station, or access point, and other data radios coupled to the remote devices for transmitting telemetry data to the SCADA system and for receiving messages back for controlling their operations. In a typical installation, the access point handles communications with hundreds of remote data radios.

The data radios (also referred to as remote wireless terminals) access a shared wireless channel by using either a random access protocol or a centrally coordinated protocol or a combination of the two. Random access protocols generally achieve low latency under low traffic conditions but suffer long queue times (latency) and poor throughout under higher traffic conditions. Under typical high traffic conditions, throughput using a random access protocol is limited to approximately 30% of the channel capacity.

Although centrally coordinated access protocols theoretically achieve near 100% of the channel capacity, the access point must have knowledge of when the radios are ready with data to transmit. In remote SCADA and telemetry networks, however, only a subset of radios may be ready with data at any given time and the access point is generally unaware which of the radios are actually ready. This situation leads to significantly lower throughput of about 30%, which is comparable to random access protocols.

SUMMARY

Aspects of the present disclosure manage remote terminal communications in remote SCADA and telemetry networks and the like by enabling an access point of a private data radio network to predict which remote data radios are ready to transmit data and when. In turn, this enables a centrally coordinated access protocol to achieve its full potential resulting in high throughput and servicing more remote data radios per access point than traditional access protocols.

In an aspect, a method of managing communications in a SCADA system comprises establishing communication between a plurality of remote industrial assets and a SCADA server of the SCADA system via a private data radio network. The SCADA server is configured for monitoring telemetry data from the industrial assets and providing supervisory control. The private data radio network comprises a plurality of data radios, one of which is an access point. The method further comprises executing reinforced machine learning on messages transmitted between the data radios and the access point. The machine learning includes processing header data of a training set of the messages from the access point to the data radios to learn which of the header data correlates to soliciting a response from the data radios and learning response time delays of the data radios for retrieving the telemetry data from the at least one of the industrial assets associated therewith in response to the training set of the messages. The method also includes inspecting header data of the messages transmitted by the access point to predict a set of solicitation messages from which the data radios are being solicited for responses and corresponding response time delays and generating a coordinated access protocol for communicating the responses to the predicted solicitation messages from the data radios to the access point based on which of the data radios are being solicited for responses and the predicted response time delays corresponding thereto.

In another aspect, an automation system includes a plurality of remote industrial assets and a SCADA system configured for monitoring telemetry data from the industrial assets and providing supervisory control. The system also includes a private data network configured for communication between the industrial assets and a SCADA server of the SCADA system. The private data radio network comprises a plurality of data radios, one of which is an access point that includes a coordinated access processor. A memory device stores computer-executable instructions that, when executed by the coordinated access processor, configure the coordinated access processor for executing reinforced machine learning on messages transmitted between the data radios and the access point. The machine learning includes processing header data of a training set of the messages from the access point to the data radios to learn which of the header data correlates to soliciting a response from the data radios, learning response time delays of the data radios for retrieving the telemetry data from the at least one of the industrial assets associated therewith in response to the training set of the messages, and inspecting header data of the messages transmitted by the access point to predict a set of solicitation messages from which the data radios are being solicited for responses and corresponding response time delays. The computer-executable instructions, when executed by the coordinated access processor, further configure the coordinated access processor for generating a coordinated access protocol for communicating the responses to the predicted solicitation messages from the data radios to the access point based on which of the data radios are being solicited for responses and the predicted response time delays corresponding thereto.

In yet another aspect, a method for managing remote terminal communications in remote SCADA and telemetry networks comprises transmitting solicitation messages to a plurality of remote data radios using a centrally coordinated wireless access point. The method further includes processing header data of multiple messages received from the remote data radios using a solicitation detection device to learn which of the header data in the received messages correlates with a response being generated by the data radios in response to the solicitation messages, and which of the header data correlates with other types of messages received from the data radios. In addition, the method comprises learning the time delay of the data radios to generate the response to the solicitation messages, inspecting packets transmitted by the centrally coordinated wireless access point to predict which of the data radios are currently ready with a response to transmit based on or using information associated with the learned time delay, and using information associated with the predictions to efficiently allocate time on the shared wireless channels to the data radios that are currently ready with the response. In this manner, the method increases the throughput limits of the channels and reduces latency.

Other objects and features of the present disclosure will be in part apparent and in part pointed out herein.

BRIEF DESCRIPTION OF DRAWINGS

FIGS. 3A and 3B illustrate an example header for a communication within the systems of FIGS. 1 and 2.

Corresponding reference numbers indicate corresponding parts throughout the drawings.

DETAILED DESCRIPTION

Figure 1:
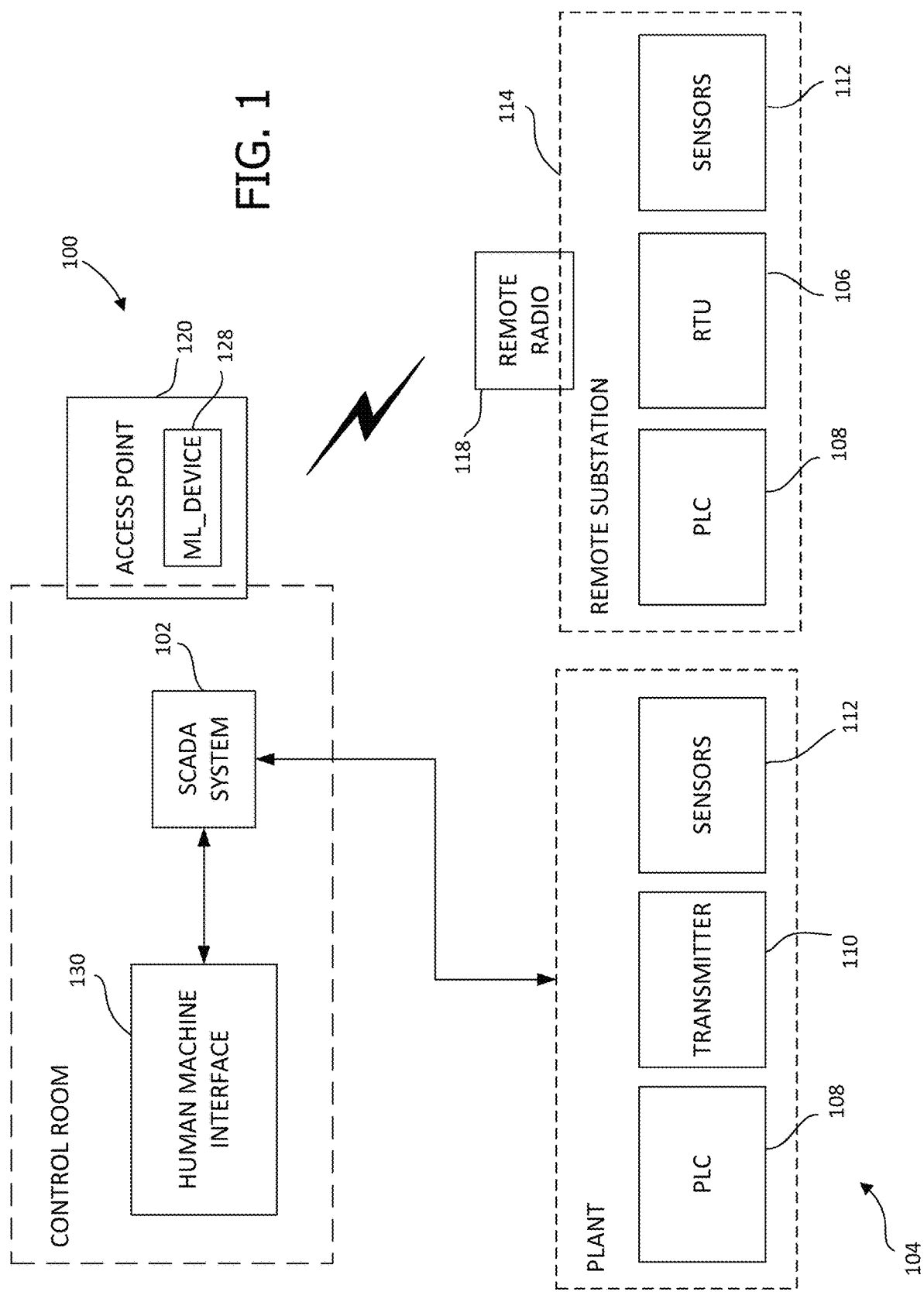
FIG. 1 illustrates an automation system according to an embodiment.
Figure 2:
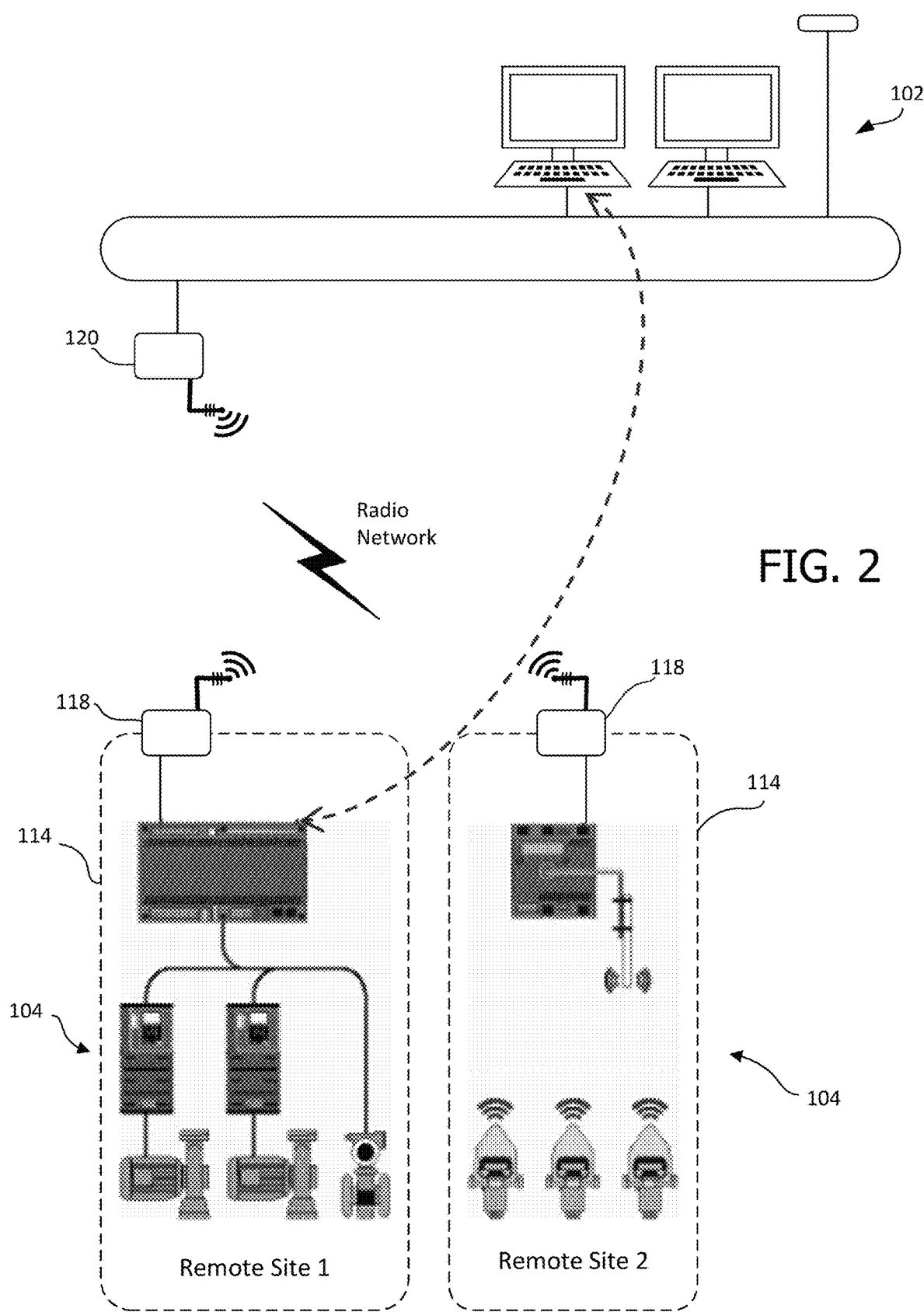
FIG. 2 illustrates an automation system according to another embodiment.

Referring to FIG. 1, an automation system is generally indicated 100. FIG. 2 is a block diagram of the system 100 according to another embodiment. The automation system 100 includes a Supervisory Control and Data Acquisition (SCADA) system 102 communicating with one or more industrial assets, generally indicated 104. In the illustrated embodiment, the industrial assets 104 include one or more industrial control and monitoring devices, such as a remote terminal unit (RTU) 106, a programmable logic controller (PLC) 108, and/or a peripheral, such as a multivariable transmitter (MVT) 110 or sensor 112. Other peripherals include actuators, variable frequency drives, motor controllers, pressure transmitters, Coriolis meters, magnetic flow meters, etc. (not shown). In another embodiment, asset 104 comprises a computing device.

The SCADA system 102 of FIG. 1 is coupled to a remote substation 114 via a communications network, such as a private data radio network and/or a cellular telephone network. In the illustrated embodiment, the remote substation 114 and the SCADA system 102 communicate with each other via a private data radio network, which including a plurality of remote radios 118 associated with one or more remote substations 114 and a base station, or access point, 120 associated with SCADA system 102. The substation 114 typically includes a number of peripherals and at least one RTU 106 for data acquisition from substation 114 and/or from SCADA system 102. The RTU 106 transmits telemetry data to SCADA system 102 and receives messages back for controlling connected physical objects of remote substation 114. In addition to the RTU 106, peripherals, and other components of remote substation 114, the SCADA system 102 communicates with at least one PLC 108. In a SCADA-based control system, PLC 108 is connected to, for example, a sensor 112 for collecting the sensor output signals and converting the signals into digital data. The SCADA system 102 may also communicate with a multi-variable transmitter, such as MVT 110, which is used to measure flow, differential pressure, temperature, pressure, or the like. The various assets 104, including RTU 106, PLC 108, MVT 110, and/or sensor 112, communicate with SCADA system 102 according to different protocols (e.g., DNP3, Modbus, IEC-104). The automation system 100, including data radios 118, may be an electrical grid automation system, a water grid network monitoring system, or the like.

According to aspects of the present disclosure, a centrally coordinated wireless access protocol employs machine learning to predict which data radios 118 will respond to messages, which allows access point 120 to efficiently allocate channel time to the data radios 118 that are ready and waiting to transmit data. As described in greater detail below, the access point 120 comprises a processor coupled to a memory device storing computer-executable instructions, including reinforced machine learning algorithms. The processor and associated computer-executable instructions are indicated ML_Device 128 in FIG. 1. When executed, these instructions configure ML_Device 128 to coordinate time on the channel for selected radios 118 to transmit their data. Suitable data radios for use as remote radio 118 and/or access point 120 are Trio licensed Ethernet and serial data radios available from Schneider Electric. These licensed UHF data radios provide serial and Ethernet connectivity for long range wireless data communications in a wide range of SCADA and telemetry applications.

As shown in FIG. 1, SCADA system 102 operates in conjunction with a human-machine interface (HMI) 130. The HMI 130 is an input-output device that presents process information to a human operator. The SCADA system 102 links to HMI 130 for providing maintenance procedures, detailed schematics, logistic information, trend data, diagnostic data, configuration data transfer, and the like for a specific sensor or machine. In an embodiment, HMI 130 comprises a personal computer, smartphone, tablet, touchscreen HMI device, or the like. Although illustrated in a control room remotely from the various industrial assets 104, it is to be understood that HMI 130 could be hosted on the device itself.

As described above, industrial automation systems, such as system 100, typically include many industrial assets 104 executing many applications. For the sake of convenience, however, the description below refers to an example in which the industrial asset 104 is RTU 106 of SCADA system 102.

In an embodiment, the RTU 106 is used as a control device. A communication bus provides communication for the complete substation 114 and all parts of the substation are accordingly connected thereto, whether directly or indirectly. The RTU 106 is configured to be connected to a computer (e.g., a personal computer, desktop, laptop, workstation machine, etc.) of SCADA system 102 to access and control settings and parameters as well as a real-time database.

The RTU 106 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 106 in an oil and gas application include: tank monitoring and automation; well test automation; Emergency Shut-Down (ESD) at well heads; well production and optimization; and measurement.

In an oil and gas environment, for example, substation 114 is located at a well site to gather data about various aspects of the well site for monitoring and tracking purposes. The substation 114, which acts as a control unit, includes RTU 106 for collecting data on pump motor operation (e.g., motor speed and load). A variable speed drive motor controller, for example, generates this motor data. The RTU 106 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 106 can determine the tension or load (vertical axis) on the rod versus the displacement (horizontal axis) of the rod per stroke or pump cycle (i.e., upward and downward movement). Other data collected by RTU 106 from the field sensors may include fluid flow rate, temperature, pressure, and the like.

In an embodiment, RTU 106 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 106 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU 106 embodying aspects of the present disclosure involves electrical applications such as wind, solar, transformer stations, etc. Diversification of energy production resources require utility operators to manage a much wider portfolio of assets. Moreover, assets such as wind turbines and solar cells are often located in harsh, remote environments. In an embodiment, RTU 106 monitors active and reactive power, phase voltage, connection status of switches, and the like.

Yet another use case for the RTU 106 embodying aspects of the present disclosure involves autonomous, remotely located assets 104, including critical infrastructure assets, where high control system, monitoring, and reporting availability as well as data analytics associated with control systems, asset performance, and custom application features are requested.

Referring further to FIG. 1, in an embodiment, access point 120 comprises a processor that executes reinforced machine learning algorithms, indicated ML_Device 128. Aspects of the present disclosure use the reinforced machine learning algorithms of ML_Device 128 implemented within access point 120 (i.e., a central wireless coordinator) to predict whether remote data radios 118 will respond to messages from access point 120 and, if so, when remote data radios 118 will become ready with data to transmit (i.e., what is the predicted response delay). In other words, ML_Device 128 of the access point 120 radio attempts to predict if a message sent over the air to the remote site, i.e., remote substation 114, will solicit a response from any device (e.g., RTU 106, PLC 108, sensor 112) that is connected to the remote data radio 118 or from the remote data radio 118 itself (e.g., Simple Network Management Protocol is implemented in the remote data radio).

For training its predictive model, ML_Device 128 observes if a response is solicited and the actual delay to generate the response. Depending on the actual behavior matching the predicted behavior, the ML_Device 128 adjust the bias in the state-behavior mapping table (reinforced learning) to improve the accuracy of its predictive model. The remote radio 118 measures and reports the actual delay for the RTU 106 to generate a response, which is shared with the ML_Device 128 of access point 120 when the response is delivered up to the access point 120. Based on the predictions, access point 120 subsequently coordinates time on the channel for selected radios 118 to transmit their data.

To determine if a response is solicited, ML_Device 128 inspects flags within the packet headers of messages from access point 120 to remote data radios 118. The messages may be formatted according to any of a number of known protocols (e.g., ICMP, TCP, DNP3, Modbus/TCP) but ML_Device 128 learns which flags in the headers correlate with a response being generated by the data radios 118. In this manner, ML_Device 128 detects response solicitations. Once the packet headers' flags have been determined to solicit responses, the time delays of the data radios 118 to generate the responses are also learned. In this manner, the reinforced machine learning algorithms of ML_Device 128 implemented within access point 120 can generate a prediction of when a particular data radio 118 will become ready with data to transmit after being solicited for data from a central computer (i.e., a SCADA server) of SCADA system 102 via access point 120.

Figure 3A:
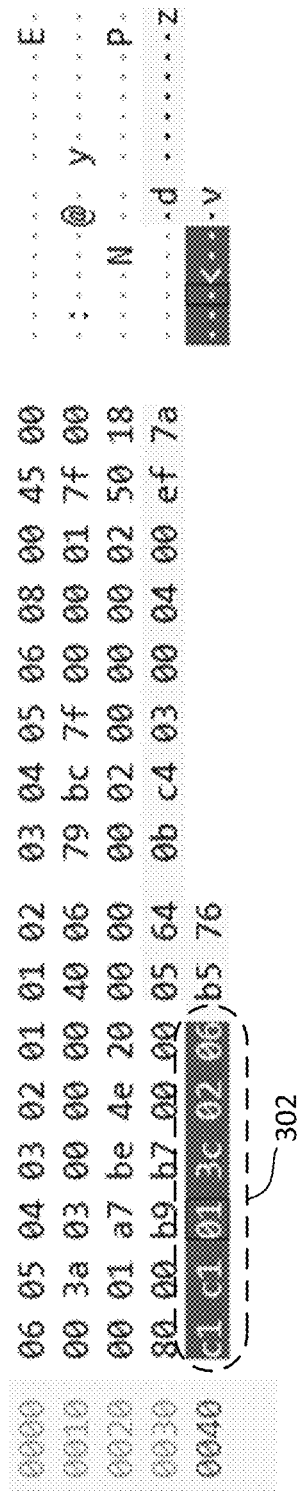

FIGS. 3A and 3B illustrate an example header for a communication within the system 100. In this example, a message header 302 is formatted according to the DNP3 protocol transported over the TCP protocol and a value 0x01 at offset 0x42 indicates a read command 304, which will solicit a response from RTU 106 when the DNP3/TCP protocol is in use, in this example. In turn, ML_Device 128 detects the response solicitation for training the predictive model. Once the solicitation and time delay attributes have been learned and ML_Device 128 has trained the predictive model, ML_Device 128 inspects packets transmitted by access point 120 and predicts which data radios 118 are currently ready with a response to transmit. In general, the message packets are integrated such that solicitation requests cannot be discerned from simply examining the packet. The access point 120 then uses the predictions of the ML_Device 128 to efficiently allocate time on the channel to data radios 118 that are currently ready, increasing the throughput limits of the channel and reducing latency.

The ML_Device 128 embodies a solicitation detection device configured to record header data of messages transmitted by access point 120 according to an embodiment. If a response is received from data radio 118, the outbound message from access point 120 to data radio 118 is deemed a solicitation by the solicitation detection device. The solicitation detection device processes header data of multiple solicitation and non-solicitation messages to learn which header data, without regard to the protocol, indicates a solicitation message. Then, with each outbound message, access point 120 receives a prediction from the solicitation detection device indicating whether a particular message is a solicitation. For each solicitation message, the response delay estimate for the message represents a deadline after which the response will be ready in the data radio 118. This information permits access point 120 to implement a centrally coordinated wireless access protocol (e.g., preemptive polling) that efficiently allocates channel time to the solicited data radios 118. With each response received by the centrally coordinated wireless access protocol, the actual time for the data radio 118 to become ready is input to the response delay estimate, which permits ML_Device 128 to update its model to improve prediction accuracy.

As ML_Device 128 continues to learn and predict with some accuracy which/when remote radios 118 have responses to deliver, the remote radios 118 utilize coordinated channel access orchestrated by the base station radio of access point 120. In an embodiment, the centrally coordinated wireless access protocol resorts to a random access mode to deliver responses from remote radios 118 to the base station radio, i.e., access point 120, so long as access point 120 does not preemptively allocate time/bandwidth to the remote radio on time (which is typical in an 'untrained' state).

Although described in the context of a SCADA environment, it is to be understood that aspects of the present disclosure are applicable to other polled systems in which responses are solicited from a base station.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/ or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. An automation system comprising:
   a plurality of remote terminals;
   a Supervisory Control and Data Acquisition (SCADA) system, the SCADA system comprising a SCADA server configured for monitoring telemetry data from the remote terminals and providing supervisory control;
   a private data network configured for communication between the remote terminals and the SCADA server of the SCADA system, wherein the private data radio network comprises an access point, and wherein the access point comprises a coordinated access processor;
   a memory device storing computer-executable instructions that, when executed by the coordinated access processor, configure the coordinated access processor for:
   transmitting one or more solicitation messages to the remote terminals using a centrally coordinated wireless access protocol;
   processing header data of multiple messages received from the remote terminals using a solicitation detection device to learn which of the header data in the received messages correlates with a response being generated by the remote terminals in response to the solicitation messages, and which of the header data correlates with other types of messages received from the remote terminals;
   learning the time delay of the remote terminals to generate the response to the solicitation messages;
   inspecting packets transmitted by the centrally coordinated wireless access protocol to predict which of the remote terminals are currently ready with the response to transmit based on or using information associated with the learned time delay; and
   using information associated with the predictions to efficiently allocate time on the shared wireless channels to the remote terminals which are currently ready with the response, thereby increasing the throughput limits of the channels and reducing latency.

2. The system of claim 1, wherein the multiple messages include both solicitation messages and non-solicitation messages.

3. The system of claim 1, wherein processing the header data includes a comparison of the header data of the solicitation messages with the header data from the received messages.

4. The system of claim 1, wherein flags within the packet headers are inspected to learn which flags correlate with the response being generated by the remote terminals.

5. The system of claim 1, wherein the header data of the multiple messages received from the remote terminals comprises one or more flags, and wherein inspecting the packets comprises identifying which of the flags correspond to the response being generated by the remote terminals.

6. The system of claim 1, wherein the computer-executable instructions executed by the coordinated access processor comprise reinforced machine learning on messages transmitted between the remote terminals and the access point.

7. The system of claim 6, wherein the reinforced machine learning comprises processing header data of a training set of messages from the access point to the remote terminals to learn which of the header data correlates to soliciting the response from the remote terminals.

8. The system of claim 1, wherein the computer-executable instructions, when executed by the coordinated access processor, further configure the coordinated access processor for generating the coordinated access protocol.

9. The system of claim 8, wherein generating the coordinated access protocol comprises preemptively polling the remote terminals receiving the solicitation messages.

10. The system of claim 1, wherein the private data radio network comprises a plurality of data radios each associated with at least one of the remote terminals.

11. The system of claim 1, wherein the access point is associated with the SCADA server.

12. The system of claim 1, wherein the remote terminals comprise one or more of the following: a remote terminal unit (RTU) device, a programmable logic controller (PLC), and a peripheral device.

13. The system of claim 1, wherein the private data radio network comprises a plurality of data radios and wherein one of the data radios comprises the access point.

14. A method for managing remote terminal communications in remote Supervisory Control and Data Acquisition (SCADA) and/or telemetry networks, the method comprising:
   transmitting one or more solicitation messages to a remote terminal using a centrally coordinated wireless access protocol;
   processing header data of multiple messages received from the remote terminals using a solicitation detection device to learn which of the header data in the received messages correlates with a response being generated by the remote terminals in response to the solicitation messages, and which of the header data correlates with other types of messages received from the remote terminals, wherein the header data of the multiple messages received from the remote terminals comprises one or more flags;
   learning the time delay of the remote terminals to generate the response to the solicitation messages;
   inspecting packets transmitted by the centrally coordinated wireless access protocol to predict which of the remote terminals are currently ready with a response to transmit based on or using information associated with the learned time delay, wherein inspecting the packets comprises identifying which of the flags correspond to the response being generated by the remote terminals; and
   using information associated with the predictions to efficiently allocate time on the shared wireless channels to the remote terminals which are currently ready with the response, thereby increasing the throughput limits of the channels and reducing latency.

15. The method of claim 14, further comprising executing reinforced machine learning on messages transmitted between the remote terminals and the access point.

16. The method of claim 15, wherein executing the reinforced machine learning comprises processing header data of a training set of messages from the access point to the remote terminals to learn which of the header data correlates to soliciting the response from the remote terminals.

17. The method of claim 14, further comprising configuring a coordinated access processor for generating the coordinated wireless access protocol.

18. The method of claim 17, wherein generating the coordinated access protocol comprises preemptively polling the remote terminals receiving the solicitation messages.

19. The method of claim 14, wherein the private data radio network comprises a plurality of data radios each associated with at least one of the remote terminals.

20. The method of claim 14, wherein the access point is associated with the SCADA server.

21. The method of claim 14, wherein the remote terminals comprise one or more of the following: a remote terminal unit (RTU) device, a programmable logic controller (PLC), and a peripheral device.

* * * * *